United States Patent Office 3,781,419
Patented Dec. 25, 1973

3,781,419
SCILLILOIDGLYCOSIDE CONTAINING
POISON COMPOSITIONS
Tsugiharu Tokunaga, 3-2-35 Yawatacho, Musashinoshi,
Tokyo, Japan
No Drawing. Filed June 25, 1970, Ser. No. 49,941
Claims priority, application Japan, July 11, 1969,
44/54,553
Int. Cl. A01n 17/14; C07c 173/00
U.S. Cl. 424—84
10 Claims

ABSTRACT OF THE DISCLOSURE

An effective rodenticidal ingredient, insensitive to atmospheric moisture, is provided by complexing scilliloidglycoside with a phospholipid in the presence of cacao lipid and yoke lipid protein. The effective rodenticidal ingredient is then admixed with various known ingredients such as feeds, pigments, and the like, to form an effective rodenticidal composition.

This invention relates to compositions having rodenticidal properties. More particularly, this invention relates to rodenticidal compounds and methods for their preparation.

It has long been known that scilliloidglycoside is a highly active poison with respect to various rodents, particularly those of the rat family. It has also long been known that this glycoside is obtainable by extraction from red squill (*Urginea maritima* Bak.). Illustrative of this fact is that the extraction of the effective scilliloidglycoside from red squill has often been reported in the literature. For example, F. R. Winton, Journal of Pharmacology and Exp. Therap., 31, 123 (1927) used acetone while L. A. Dangel (Annales d'Hygiene, 1935, 677–701) used alcohol containing acetic acid to separate and extract the active glycoside from red squill. Other reported methods of extraction include such solvent extractants as water, ethyl alcohol and methanol. See, for example, D. Mann (Seifensieder, 63, 721 (1936), 64, 255, 273 (1937), French Pat. No. 807,294, 1936, 611, U.S. Pat. No. 1,952,977, 1931, 5.29).

The purification of the above-described active glycoside from the raw material obtained by the above-described extracting techniques has been reported, for example, by F. H. J. Picard (Utrecht University, a graduation thesis, 1936). In this purification method, the acetone extract obtained from Winton, supra, was treated with lead hydroxide and dried. Thereafter, the material was heated to 105–110° C. so that the cardiac glycosides were decomposed. After decomposition, the remaining materials were subjected to filtration by active carbon so that the toxic glycosides were obtained. A similar process of purification using as the initial extractant, 80% alcohol, and using active carbon in an aqueous solution, was reported by F. J. Leblanc and C. O. Lee (Journal of the American Pharmaceutical Association, 28, 151 (1939)). As a further example, it has been reported that it is possible to obtain the highly toxic scilliloidglycoside by extraction with water-insoluble organic solvents of a mixture of these solvents, to which there is added alcohol having up to 4 carbon atoms in the presence of water.

As can be seen from the above, scilliloidglycosides are well known for their toxicity to rodentia. Unfortunately, these glycosides are extremely unstable in atmosphere in that they have the tendency to hydrolyze and decompose when contacted by air having moisture therein. This is true not only of the raw scilliloidglycosides found in the crude red squill, but also of the purified glycosides obtained by extraction and purification in accordance with one of the above-described prior art methods. This sensitivity to moisture in the atmosphere constitutes a serious drawback to the use of these materials in rat poisons since the effectiveness of such poisons rapidly decreases to the point of being totally ineffective when the poison is placed in its appropriate environment.

It is evident from the above that there exists a definite need in the art for a rodenticide which is both effective and which does not lose its effectiveness over a long period of time.

It is the purpose of this invention to fulfill this need in the art. Generally speaking, this invention fulfills the above-described need in the art by providing scilliloidglycoside in such a form that it will not hydrolyze when subjected to moisture in the atmosphere and thus will retain its toxic effect over long periods of time. In addition, the form of the scilliloidglycoside contemplated by this invention not only increases the life of the poison when placed in its environment, but actually enhances the toxicity of the glycoside over known rat poisons using this glycoside.

Basically, the form of the scilliloidglycoside contemplated by this invention, which form may be used as a rodenticide, is a complex of a phospholipid and said scilliloidglycoside. Although not limited to any particular theory, it is thought that the complex consists of the phospholipid reacted with the glycoside such that the phospholipid esterifies the glycoside, thus helping to stabilize the compound against atmospheric hydrolysis. Preferably, the phospholipid is used in an excess molar amount and the complex is further reacted with cacao oil such that the excess phospholipid binds with the cacao oil, thus protecting the sensitive glycoside further from possible hydrolysis when contacted with moisture in the atmosphere. Still more preferably, the complex mixture described is further reacted with yolk lipoprotein, which compound has been found to enhance the rodenticidal properties of the scilliloidglycoside in the mixture.

Scilliloidglycoside is well known in the art, as discussed above, for its rodenticide properties. Generally speaking, the art recognized formula which represents this glycoside is as follows:

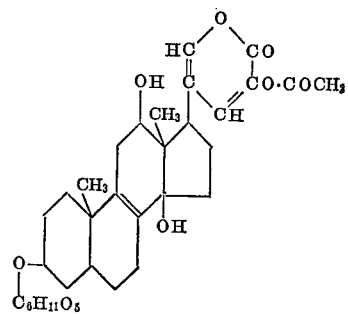

Phospholipids are well known in the art. Generally speaking, these materials are found in the cells of living organisms and generally in the protoplasm of the tissue cells of the various organs in animal life. Any of these phospholipids may be used in the practice of this invention. Generally speaking, the phospholipids contemplated are esters of glycerin, wherein two of the three hydroxyl groups in the glycerin have been esterified with fatty acids and the remaining hydroxyl group with phosphoric acids. Examples of such phospholipids include lecithin, lysolecithin, cephalin, phosphatidyl serine, phosphoinoside, phosphatidic acid, polyglycerophosphatide, sphingomyerin, plasmalogen, and the like. These phospholipids may be used alone or in admixture. A particularly preferred phospholipid, because of the unique results obtained by its use, is lecithin. Lecithin is a well known phospholipid produced in accordance with conventional techniques and represented by the following art recognized structural formula:

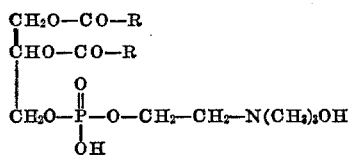

wherein R is a fatty acid radical, preferably $C_{17}H_{35}$.

Although this invention is not limited to any particular theory, it is thought that the reaction mechanism which forms the unique rodenticidal complex of this invention is illustrated as follows:

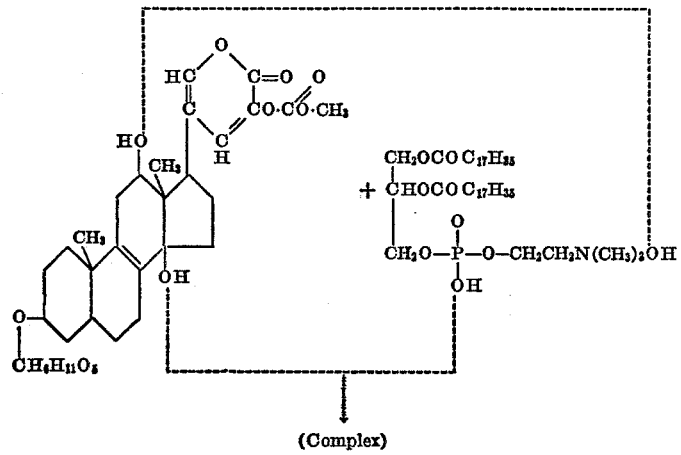

(Complex)

As stated hereinabove, the complex so formed is preferably admixed with cacao oil and yolk lipoprotein to further stabilize it and to enhance its rodenticidal effects. This is preferably accomplished by using an excess amount of phospholipid (e.g., lecithin) in the above reaction formula so that sufficient phospholipid remains to bind with the cacao oil upon heating.

Cacao lipid (oil) is particularly preferred for the purposes of this invention since it is soft, fatty-like to the touch, and chocolate-like to the smell. Thus, this particular lipid finds excellent suitability for the purposes of formulating rodent poisons since it helps attract the animal thereto. In addition, the cacao lipid has a melting point of about 30–40° C. and in its natural state is a solid with a white or creamy color at room temperature. Therefore, undue heating of the scilliloidglycoside complex does not have to take place in order that the glycoside be dissolved in the lipid when it is warmed to render it a liquid. Furthermore, it has been found that the cacao lipid acts to conceal the bitter taste of the scilliloidglycoside and thereby make the poison more appealing to the rodent which eats it.

Yolk lipoprotein is a term well understood in the art. Generally speaking, yolk lipoprotein is the main component of yolk used in the production of this invention. While yolk from any bird's egg may generally be used, it is preferred to use the yolk of a hen's egg because of its high rodenticidal strengthening effect upon the scilliloidglycosides as well as its ready accessability and good economic features.

In order to formulate rodent poisons, particularly applicable for killing rats of conventional size, the above-described complex having been bound to cacao oil and having admixed therewith egg yolk to enhance its rodenticidal properties is further admixed with various other conventional ingredients to form the poison. Examples of other conventional ingredients used alone or in combination where applicable include rice flour, wheat flour, various other rodent foods, preservatives, pigments, and the like.

While the complex described above may be formulated separately and thereafter admixed with the cacao oil and egg yolk, it is preferred for the purposes of this invention to formulate the complex in situ by admixing the scilliloidglycoside phospholipid, yolk and cacao oil (the cacao oil having been heated and fused in advance) and heating the mixture to a temperature of about 40–45° C. to effect a substantially homogeneous mixture and allow the complex reaction to take place. It is thought that by allowing the complex to form in the presence of egg yolk the rodenticidal properties of the complex are optimally enhanced.

The biological mechanism by which the poisons contemplated by this invention, function is relatively rapid and insures a quick demise of the rodent which eats the poison. On the other hand, because of the controlled amount of the poison used, the poison is found to be particularly selective to rodents, especially rats, and generally does not harm other animals such as cows, horses, dogs, cats, and natural enemies of rats such as weasels and snakes, which may also inhabit the area in which the poison is placed.

This is generally believed to be the case because of the nature of the mechanism by which the poison enters the relevant areas of the body. Upon eating of the poison, it travels to the intestines through the organs of digestion where it is emulsified by the alkalis in the intestines and passed directly into the blood. As soon as it permeates into the blood, aglucon by sugar separation, uncovers the toxicity of the compound and increases the solubility thereof because of the coexistence of the lipid within the phospholipid complex. Because the phospholipids occur in large amounts in the heart and brain of rodents, especially rats, and because they are readily needed in these organs, the poison passes rapidly to both the heart and brain of the animal which eats the poison thus causing an intense shock to these organs followed by paralysis of the central nervous system and a rapid decrease in the ability of the heart to maintain its beat. Death follows shortly thereafter.

It is, of course understood that time of death will vary, depending upon the size of the animal, its physiological make-up and the amount of poison which it takes. Generally speaking, the poisons of this invention envision using between about 0.2–0.3 milligram of effective ingredients per gram of poison. Such a range of effective ingredients (the complex of scilliloidglycoside and lecithin) has been found as a sure killer of rats having an average size of approximately 200 grams within less than about 10 hours. If, on the other hand, only smaller rodents are desired to be killed, as, for example, where large red-back voles (*Clethrionomys rufocanus bedfordiae*) are a problem as opposed to the rat problem, then one needs only between about 27–48 mcg. of active ingredient (complex of scilliloidglycoside and lecithin) per one gram of the overall composition. Such is usually effective to kill any animal smaller than about 30 grams in weight. Larger animals can, of course, be killed by increasing the amount of complex in the poison.

As can be seen, because of the highly stable nature of the active ingredient contemplated by this invention, the poison is an extremely accurate one when compared to the prior art poisons which, because of hydrolysis, are constantly decreasing in toxicity. This advantage constitutes a distinct improvement over the prior art.

The following examples are presented by way of illustration rather than limitation.

EXAMPLE 1

Method of obtaining relatively pure scilliloidglycoside

While any of the above-named prior art procedures for obtaining purified scilliloidglycoside may be used, it is preferred to use the following technique given in example form:

100 kg. of bulbs of fresh red squills which were collected in summer after the falling of blossoms, were cut into round slices, dried in a drying apparatus at about 50-60° C., and then pulverized. About 20 kg. of the powder resulting were put into a conventional extraction device and subjected to extraction with ethyl alcohol for several hours with stirring. After exhaustive extraction, the reddish brown solution obtained by filtration with pressure was concentrated in vacuo at approximately room temperature and dried, the resulting product being 1.23 kg. of residual matter. This residue was admixed into 50 liters of water and about 400 g.–500 g. of 5% lead hydroxide aqueous solution was thoroughly admixed therewith. The resulting mixture was carefully filtered. The thus obtained clear solution which was colored slightly, was concentrated in vacuo at about room temperature to 5–10 liters. The concentrate was exhaustively extracted with 2 liters of chloroform, to which 20% butyl alcohol was added and the extract collected was again evaporated in vacuo, the product resulting being about 50 g.–80 g. of residual matter. This residue was slightly yellow and showed a strong blue-green color by the Liebermann's Color Reaction Test.

The resulting residue was added into 2 liters of water and was exhaustively extracted with 1 liter of chloroform until a portion became an emulsion. The yellow viscous substance appearing was discarded and the remaining emulsion was saturated with chloroform, the greater part of the substances appearing dissolved at first but were again extracted. This aqueous solution was extracted with 1 liter of chloroform containing 5% of butyl alcohol for from 8 to 10 times and the raw rat poison product was transferred into the chloroform and butyl alcohol layer, but the cardiac glycosides were left in the aqueous solution.

After these extracts of chloroform and butyl alcohol were collected and evaporated in vacuo, 10–15 grams of residual matter was obtained according to the content of glycoside in the collected materials. The residue was dissolved in as small amount of methyl alcohol as possible, and water in an amount not to make turbid was added cautiously. After a short period of time, 2–12 grams of glycoside were obtained as collected material. When the glycoside was purified by recrystallization with methyl alcohol and water, a substantially pure scilliloidglycoside was obtained which could be used for the purposes of this invention.

Example, formation of rat poison using the scilliloidglycoside produced from above 30 grams of the scilliloidglycoside formulated in accordance with the above example were admixed with 50.0 grams of lecithin and 50.0 grams of hen's egg yolk which were thereafter added to 897.0 grams of a previously melted cacao oil and the temperature of the admixture was maintained at about 40–45° C. by the addition of heat. The reaction which forms the complex was promoted gradually with stirring slowly at atmospheric pressure for about 24–36 hours until no moisture in the oil solution could be detected. The material was then cooled and solidified into a solid mass.

The mixture so formed contained (by weight) about 3% scilliloidglycoside, 5% lecithin, 5% yolk and 89.7% cacao lipid. The molar equivalent of glycoside to lecithin was about 1:1.302, thus providing an excess of lecithin to bind with the cacao oil. The substance so formed may now be used as the active ingredient in rodenticides (e.g., ratsbane), which rodenticides will be extremely stable in their shelf life due to the masking of the active ingredient from contact with the moisture in the atmosphere.

As stated hereinabove, the complexed ingredient provided by this invention is useful as a rodenticide generally. However, for the purposes of this invention and because of the high activity with respect to rats, the complex is uniquely prepared and formulated into ratsbanes. Two particularly preferred ratsbanes for the purposes of this invention are:

| | Percent by weight |
|---|---|
| Ratsbane I— | |
| Cacao oil-yolk lecithin glycoside complex | 10 |
| Sodium dehydroacetate | 0.10 |
| Red pigment soluble in oil | 0.03 |
| Peanut flour | 20 |
| Millet flour | 10 |
| Rice flour | 15 |
| Corn flour | 44.87 |
| Ratsbane II— | |
| Vanillin (spicery) | 0.01 |
| Potassium sorbate (fungicide) | 0.10 |
| Red oil (red pigment) | 0.03 |
| Molasses | 2 |
| Sesame oil | 3 |
| Wheat flour | 20 |
| Peanut flour | 10 |
| Corn flour | 54.86 |

In these formulations, when the complex as formulated in accordance with the above examples is used, there is provided 0.3 mg. of scilliloidglycoside contained in 1 g. of the poison ratsbane. The effectiveness of these ratsbanes is illustrated in the following test example which used ratsbane I in the experimentation as indicated.

TABLE A

| No. of animal | Tested animal | | | Sample | | | Hours until the death after eating |
|---|---|---|---|---|---|---|---|
| | Kind | Sex distinction | Weight, g. | Dose, g. | Apetite | Result | |
| No. 1 | Rat | Male | 165 | 1.0 | Good | Dead | 6.40 |
| No. 2 | Rat | Female | 191 | 1.0 | do | do | 8.35 |
| No. 3 | Rat | do | 185 | 1.0 | do | do | 7.21 |
| No. 4 | Rat | Male | 187 | 1.0 | do | do | 6.50 |
| No. 5 | Rat | Female | 189 | 1.0 | do | do | 5.25 |
| No. 6 | Rat | do | 193 | 1.0 | do | do | 7.31 |
| No. 7 | Rat | Male | 180 | 1.0 | do | do | 8.22 |
| No. 8 | Rat | Female | 198 | 1.0 | do | do | 6.35 |
| No. 9 | Rat | do | 210 | 1.0 | do | do | 8.37 |
| No. 10 | Rat | Male | 188 | 1.0 | do | do | 6.50 |

For the purposes of comparison, and in order to illustrate the increased rodenticidal effects of this invention over compounds containing uncomplexed scilliloidglycosides, a ratsbane was formulated as in ratsbane I above except that the relatively pure scilliloidglycoside previously obtained was used in uncomplexed form. A fatal dose to rats ($LD_{50}$) was found to necessitate an exchange value in scilliloidglycoside (mg./weight of rat [kg.]) of about 1.2852 while the exchange value of ratsbane I using the complex of this invention was found only to be 0.7834.

As can be seen from the above experimentation, not only does the complex result in an excellently stable ratsbane or rodenticide in general, but it also provides a ratsbane for rodenticides in general which has an increased toxicity and selective to rodents desired to be killed.

Once given the above invention, many other features, improvements and modifications will become apparent to those skilled in the art. Such features, improvements and modifications are therefore considered to be a part of this invention, the scope of which is to be determined by the following claims.

I claim:

1. A scillilodglycoside complexed with a phospholipid.
2. The composition of claim 1, which further includes cacao lipid.
3. The composition of claim 1 which further includes yoke lipoprotein.
4. The composition of claim 1, wherein the phospholipid is lecithin.
5. The composition of claim 1, which comprises about 3% by weight of scilliloidglycoside, about 5% by weight of phospholipid, and further includes about 5% by weight of yoke lipoprotein and about 89.7% by weight of cacao lipid.
6. The composition of claim 5, wherein the phospholipid is lecithin.
7. A poison composition comprising an effective rodenticidal amount of the composition of claim 5.
8. The poison composition of claim 7, which further includes at least one of the following: rice flour, corn flour, rodent foods, fungicides, preservatives, pigment, and mixtures thereof, wherein said scilliloidglycoside is present in an amount of about 0.2 to 0.3 milligram per one gram of poison composition.
9. A method of preparing the composition of claim 5, which comprises reacting scilliloidglycoside with an excess molar amount of a phospholipid in the presence of yoke lipoprotein and cacao lipid at a temperature of from 40 to 45° C. for about 24 to 36 hours.
10. The method of claim 9, wherein said phospholipid is lecithin.

References Cited

UNITED STATES PATENTS 3,012,888  12/1961  Davis et al. ——————— 260—403
3,518,248  6/1970  Patterman ——————— 260—210.5

LEWIS GOTTS, Primary Examiner

J. R. BROWN, Assistant Examiner

U.S. Cl. X.R.

260—210.5; 424—182